United States Patent
Lorenz et al.

(10) Patent No.: US 11,420,727 B2
(45) Date of Patent: Aug. 23, 2022

(54) AIRFOIL ARRANGEMENT FOR AN AIRCRAFT

(71) Applicant: Airbus Operations GmbH, Hamburg (DE)

(72) Inventors: Florian Lorenz, Hamburg (DE); Dustin Shapi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 5 days.

(21) Appl. No.: 16/938,258

(22) Filed: Jul. 24, 2020

(65) Prior Publication Data
US 2021/0024198 A1    Jan. 28, 2021

(30) Foreign Application Priority Data
Jul. 25, 2019  (DE) .......................... 102019120203.5

(51) Int. Cl.
  *B64C 9/24*   (2006.01)
  *B64C 3/18*   (2006.01)
  *B64C 9/02*   (2006.01)
  *B64C 7/00*   (2006.01)

(52) U.S. Cl.
  CPC .............. *B64C 9/24* (2013.01); *B64C 3/187* (2013.01); *B64C 7/00* (2013.01); *B64C 9/02* (2013.01)

(58) Field of Classification Search
  CPC .... B64C 9/02; B64C 7/00; B64C 9/18; B64C 9/24; B64C 9/22; B64C 3/185; B64C 3/50; B64C 21/02; B64C 13/34; B64C 3/28; B64C 13/0425; B64C 1/065
  See application file for complete search history.

(56) References Cited

U.S. PATENT DOCUMENTS

| | | | | |
|---|---|---|---|---|
| 2,938,680 A * | 5/1960 | Greene | ..................... | B64C 9/24 244/214 |
| 4,360,176 A * | 11/1982 | Brown | ..................... | B64C 9/24 244/214 |
| 4,753,402 A * | 6/1988 | Cole | ........................ | B64C 9/22 244/210 |
| 5,544,847 A * | 8/1996 | Bliesner | .................... | B64C 9/24 244/214 |
| 8,584,991 B2 | 11/2013 | Schlipf et al. | | |
| 9,016,636 B2 | 4/2015 | Parker | | |
| 10,889,365 B2 * | 1/2021 | Bowers | ..................... | B64C 9/22 |
| 2009/0127402 A1 * | 5/2009 | Jaggard | .................... | B64C 9/24 244/213 |

(Continued)

FOREIGN PATENT DOCUMENTS

| | | |
|---|---|---|
| EP | 2356021 B1 | 4/2013 |
| EP | 2318269 B1 | 1/2015 |

(Continued)

OTHER PUBLICATIONS

German Search Report; priority document.

*Primary Examiner* — Assres H Woldemaryam
(74) *Attorney, Agent, or Firm* — Greer, Burns & Crain, Ltd.

(57) ABSTRACT

An airfoil arrangement which allows an increased reliability and increased aerodynamic performance of airfoils. A catching bracket is provided which is mounted in a track device opening to reduce the area of the track device opening and, when there is a failure of at least one support roller, the catching bracket engages the track device.

20 Claims, 10 Drawing Sheets

(56) References Cited

U.S. PATENT DOCUMENTS

| | | |
|---|---|---|
| 2013/0153713 A1 | 6/2013 | Wilson et al. |
| 2014/0339358 A1* | 11/2014 | Swartley .............. F16C 23/041 |
| | | 244/99.3 |
| 2015/0353187 A1 | 12/2015 | Smith |
| 2016/0167766 A1* | 6/2016 | Brakes .................... B64C 9/00 |
| | | 244/99.2 |
| 2017/0073082 A1 | 3/2017 | Ungar et al. |
| 2018/0362144 A1 | 12/2018 | Brakes |
| 2019/0300158 A1 | 10/2019 | Hui et al. |
| 2020/0122819 A1 | 4/2020 | Schlipf et al. |
| 2020/0148331 A1 | 5/2020 | Bensmann |

FOREIGN PATENT DOCUMENTS

| | | |
|---|---|---|
| WO | 2018104251 A1 | 6/2018 |
| WO | 2018197265 A1 | 11/2018 |
| WO | 2018197649 A1 | 11/2018 |

\* cited by examiner

AIRFOIL ARRANGEMENT FOR AN AIRCRAFT

CROSS-REFERENCES TO RELATED APPLICATIONS

This application claims the benefit of the German patent application No. 102019120203.5 filed on Jul. 25, 2019, the entire disclosures of which are incorporated herein by way of reference.

FIELD OF THE INVENTION

The invention relates to an airfoil arrangement for an aircraft. Furthermore, the invention relates to a wing and an aircraft equipped with the airfoil arrangement.

BACKGROUND OF THE INVENTION

WO 2018/197 265 A1 discloses a wing for an aircraft, comprising a main wing a slat, and a connection assembly for movably connecting the slat to the main wing. The connection assembly comprises an elongate and curved slat track and a first bearing as well as a second bearing. The track is movably supported on the main wing by the first and second bearing.

WO 2018/197 649 A1 discloses a wing for an aircraft, comprising a main wing and a connection assembly movable connecting a slat to the main wing. The connection assembly comprises an elongate slat track, wherein the rear end and the intermediate portion of the slat track are mounted to the main wing by a roller bearing comprising a guide rail mounted to the main wing and a first roller unit mounted to the rear end of the slat track and engaging the guide rail. The roller bearing comprises a second roller unit mounted to the main wing and engaging an engagement surface at the intermediate portion of the slat track.

SUMMARY OF THE INVENTION

It is an object of the invention to increase reliability and aerodynamic performance of airfoils.

This object is achieved by the subject-matter according to the independent claims. Advantageous embodiments are subject-matter of the dependent claims.

The invention provides an airfoil arrangement for an aircraft, the airfoil arrangement comprising a track device which is movable between an extended position and a retracted position, the track device being configured for supporting a movable edge member, a fixed edge member having an outer skin, the outer skin including a track device opening configured such that the track device moves through the track device opening when the track device is moved from the retracted position to the extended position, at least one support roller attached to the fixed edge member and configured for movably supporting the track device, and a catching bracket configured to be mounted within the track device opening so as to reduce the area of the track device opening and being configured such that, when there is a failure of at least one support roller, the catching bracket engages the track device, preferably in a force-fitted manner.

Preferably, the catching bracket comprises a bracket body that is configured to engage the track device when there is a failure of at least one support roller.

Preferably, the bracket body is configured to support the track device in a sliding manner.

Preferably, the catching bracket includes an aerodynamic portion which is configured to continuously extend the outer skin when the catching bracket is installed.

Preferably, the catching bracket includes an aerodynamic portion which is flush with the outer skin when the catching bracket is installed.

Preferably, the catching bracket, in particular the bracket body, comprises a blade seal configured for sealing a residual gap between the catching bracket, in particular the bracket body, and the track device.

Preferably, the catching bracket comprises an elastic sheet member configured to be installed with pre-tension such that the elastic sheet member is permanently engaging the track device to provide a permanent force-fitted connection between the track device and the fixed edge member.

Preferably, the airfoil arrangement further comprises a movable edge member which is attached to track device to be movable between a retracted position and an extended position.

Preferably, the movable edge member comprises an aft skin which faces the fixed edge member, wherein the aft skin and the catching bracket, in particular the bracket body, define a flow gap configured to generate a nozzle-type flow from the lower side of the airfoil arrangement to the upper side thereof.

Preferably, the flow gap is tapered towards the upper side of the airfoil arrangement.

Preferably, the catching bracket comprises a mounting strap configured to be affixed to the fixed edge member, in particular to an inboard rib and/or an outboard rib.

Preferably, the mounting strap comprises at least one mounting flange configured for transferring side loads from the track device to the fixed edge member, in particular the inboard rib and/or the outboard rib.

Preferably, the mounting strap, in particular the mounting flange, comprises a liner portion configured to slidingly engage the track device, when a side load acts on the track device, to transfer the side load to the fixed edge member, in particular the inboard rib and/or the outboard rib.

Preferably, the fixed edge member comprises an inboard rib and/or an outboard rib.

Preferably, the catching bracket is configured to be fixed to the inboard rib and/or the outboard rib.

Preferably, the support roller is fixed to the inboard rib and/or an outboard rib.

Preferably, the fixed edge member is a fixed leading edge member.

Preferably, the movable edge member is a movable leading edge member.

The invention provides a wing for an aircraft comprising a preferred airfoil arrangement.

The invention provides an aircraft comprising a preferred airfoil arrangement and/or a preferred wing.

Advantageous effects of the invention are described in more detail below. It should be noted that not all advantageous effects need to be present at the same time or with the same intensity.

In most aircraft the guidance of the leading edge track, for example, is realized by roller supporting the track on the upper and lower side, in combination with side rollers and possibly with gliding pats, which may be attached to the leading edge ribs. As a part of the leading edge high-lift system, the track may be deploying and retracting a slat in certain stages of flight, thereby allowing the wing to operate at higher angles of attack (AoA).

The roller guidance may support the track in retracted condition, during movement, and while the slat is fully deployed.

In recent concepts for wings, also called wing of tomorrow, the upper and lower roller may be supported by at least one cantilever-roller (attached to the rib and rolling inside the track, also designated support roller) and a rear roller (attached to the track itself and running inside guidance rails).

The guidance may be designed as two elements: the upper and lower rail, on which the rear roller can move while extending or retracting the slat. The rail may be attached to the leading edge ribs.

With this design, a gap exists between the track upper surface and so called D-nose skin cut out. The space between track and D-nose cover is required, to avoid clashes with the D-nose skin, in the event of a failure of one of the forward rollers.

The design proposed by the invention aims to carry loads as a secondary load path in case of a forward roller failure, for example. The second function of the proposed bracket is minimizing the gap between the track upper surface and the D-nose skin cut out.

Preferably, the proposed catching bracket is located above the track within the gap between the track and the D-nose cut out. The gap between track and catcher bracket may be defined such that on the normal operating conditions (forward roller intact) the catcher bracket is not in contact.

In the unlikely event of a failure of one of the forward rollers, the bracket may act as a second load path substituting for the failed roller. The proposed catching bracket may be flanged onto the leading edge ribs, for example, so as to introduce the loads applied to the bracket into the fixed leading edge. Preferably, a PTFE liner is arranged in the track contact area to reduce friction.

In the intact forward roller condition, the catching bracket may act like an aerodynamic seal preventing airflow from high-pressure areas below the profile (due to cut outs below the track inside the fixed leading edge high pressure will be established deploying the slat) to the D-nose surface. With this configuration, disturbances in the gap flow between the slat back skin and D-nose cover may be reduced.

Experiments conducted by the applicant show that with a closed D-nose cover cut out, one of the possible the benefits of closing these gaps may be higher achievable angle of attack. The potential benefit of this design could be between 2 to 4 degrees higher angle of attack.

In addition, the catching bracket may provide at least one of the following additional functionalities:

Main/Second load path side pad: The flanges attaching the bracket to the leading edge ribs are preferably equipped with PTFE liner so as to act as a side load pad, which is able to take over side loads from the track and introduce them to the fixed leading edge. That could be the first or second load path.

The bracket may be additionally equipped with a blades seal arranged between bracket and track, so as to almost completely seal the gap.

The bracket may be equipped with a metallic sheet metal clip, which can be installed with pre-tension, and may be permanently in contact with the track, so as to provide a bonding connection between the track and the fixed leading edge.

BRIEF DESCRIPTION OF THE DRAWINGS

Embodiments of the invention are described in more detail with reference to the accompanying drawings.

DETAILED DESCRIPTION OF THE PREFERRED EMBODIMENTS

Figure 1:
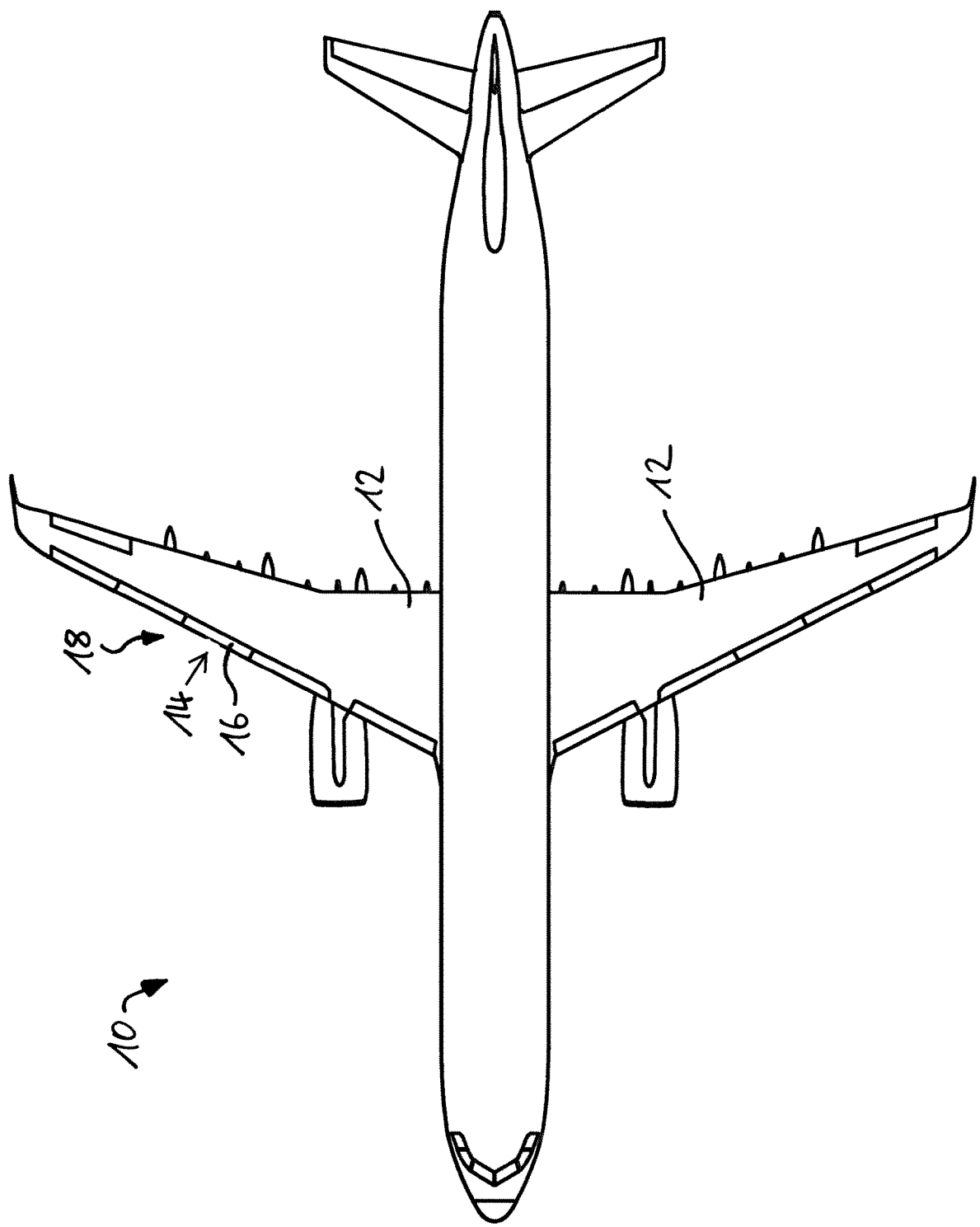
FIG. 1 depicts an aircraft according to the invention.

Reference is made to FIG. 1 which depicts an aircraft 10. The aircraft 10, in a usual manner, comprises a pair of wings 12. Each wing 12 is equipped with at least one high-lift device 14, for example a slat 16.

Figure 2:
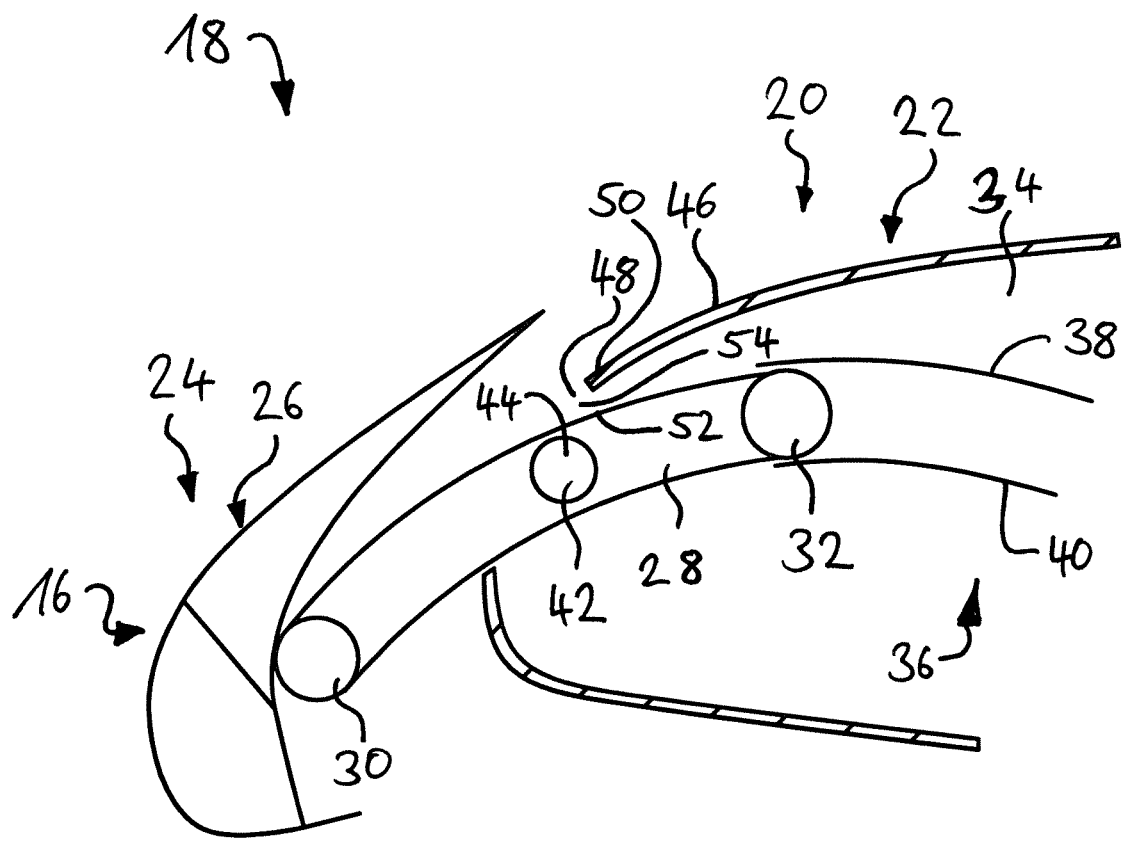
FIG. 2 depicts a cross-section of an edge member.

The wing 12 and the high-lift device 14 may form an airfoil arrangement 18, as depicted in FIG. 2, for example.

Figure 3:
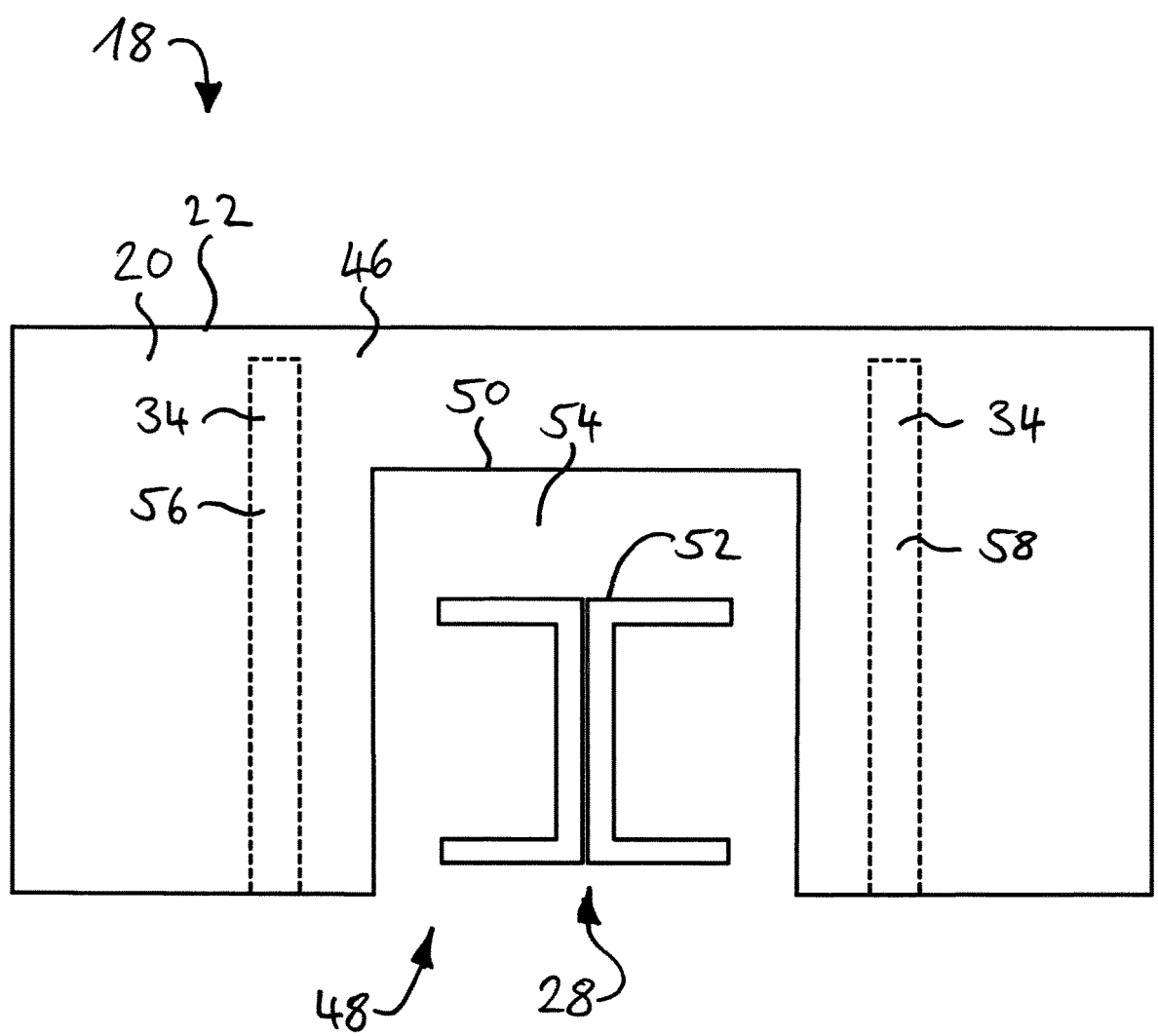
FIG. 3 depicts a frontal view of the edge member.

Referring now to FIGS. 2 and 3, the airfoil arrangement 18 comprises a fixed edge member 20. The fixed edge member 20 may be configured as a fixed leading edge member 22.

The airfoil arrangement 18 may further include a movable edge member 24. The movable edge member 24 may be configured as a movable leading edge member 26. The movable edge member 24 may be, for example, the high-lift device 14. In particular, the movable leading edge member 26 may be the slat 16.

The airfoil arrangement 18 further includes a track device 28. The track device 28 can be moved between at least one extended position and a retracted position. The track device 28 is further configured to support the movable edge member 24. In particular, the track device 28 comprises a link 30, which connects the track device 28 with the movable edge member 24.

The track device 28 may further include a movable roller 32. The movable roller 32 is fixed to the track device 28 and movable relative to the fixed edge member 20.

The fixed edge member 20 comprises a plurality of ribs 34. The ribs 34 are spaced apart from each other in a spanwise direction, for example.

The fixed edge member 20 may further comprise a guiding rail arrangement 36. The guiding rail arrangement 36 is preferably attached to the ribs 34. The guiding rail arrangement 36 may include an upper guiding rail 38 and a lower guiding rail 40. The upper guiding rail 38 and the lower guiding rail 40 are parallel and curved.

The guiding rail arrangement 36 is configured such that the track device 28, in particular the movable roller 32, engages the guiding rail arrangement 36. Thus, the track device 28 is supported on one end by the guiding rail arrangement 36. Hence, a load applied to the track device 28 is transferred via the movable roller 32 through the guiding rail arrangement 36 into the rib 34 (first load path).

The fixed edge member 20 may further comprise a support roller 42. The support roller 42 is fixed to the rib 34. The support roller 42 engages the track device 28, so as to support the track device 28. The support roller 42 is also known as a forward roller 44.

The fixed edge member 20 further comprises an outer skin 46, which forms an aerodynamic surface. The outer skin 46 includes a track device opening 48. The track device opening 48 may be formed as a cut-out of the outer skin 46. The track device opening 48 allows for the track device 28 to move between the retracted position and the extended position.

A forward edge portion 50 of the outer skin 46 and an upper surface 52 of the track device 28 define a gap portion 54. The gap portion 54 may be defined in the spanwise direction by the ribs 34, i.e., an inboard rib 56 and an outboard rib 58.

Figure 4:
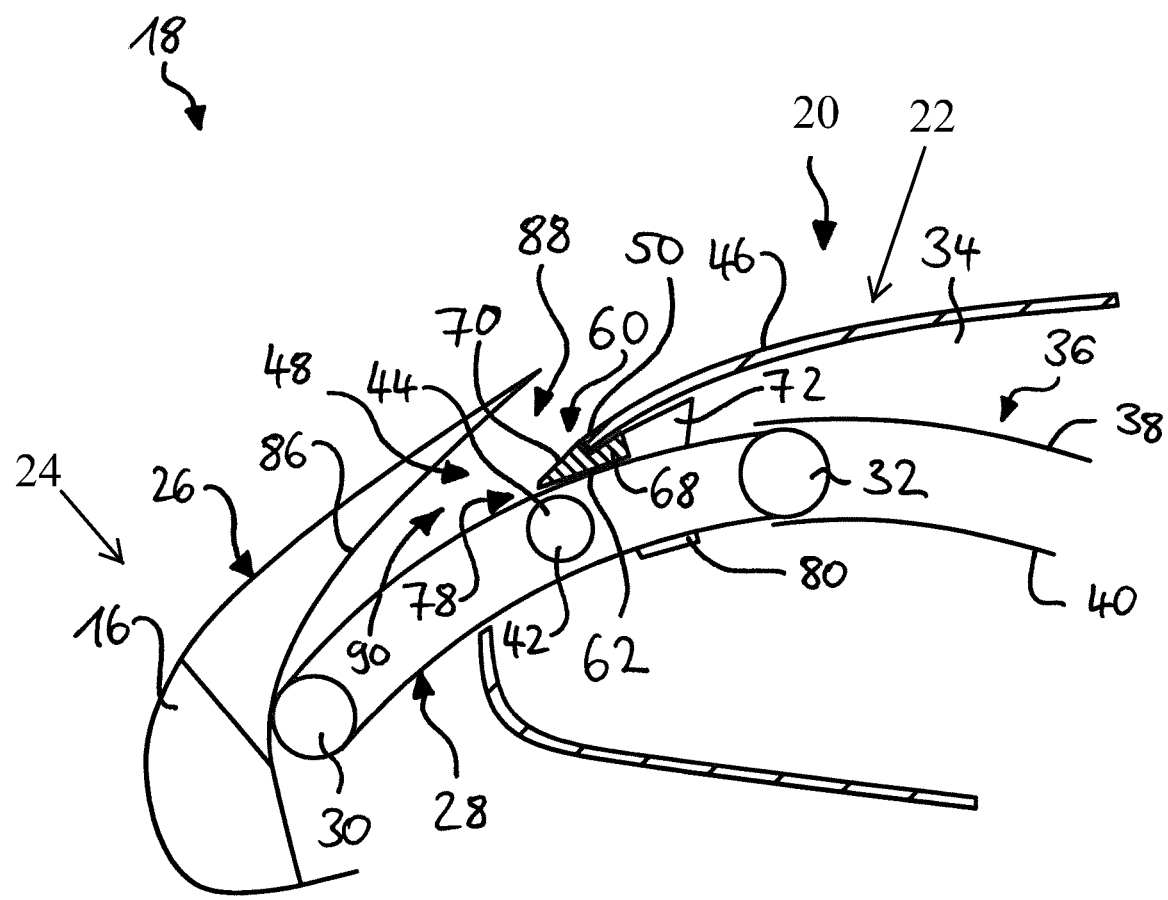
FIG. 4 depicts a cross-section of the edge member with installed catching bracket.
Figure 5:
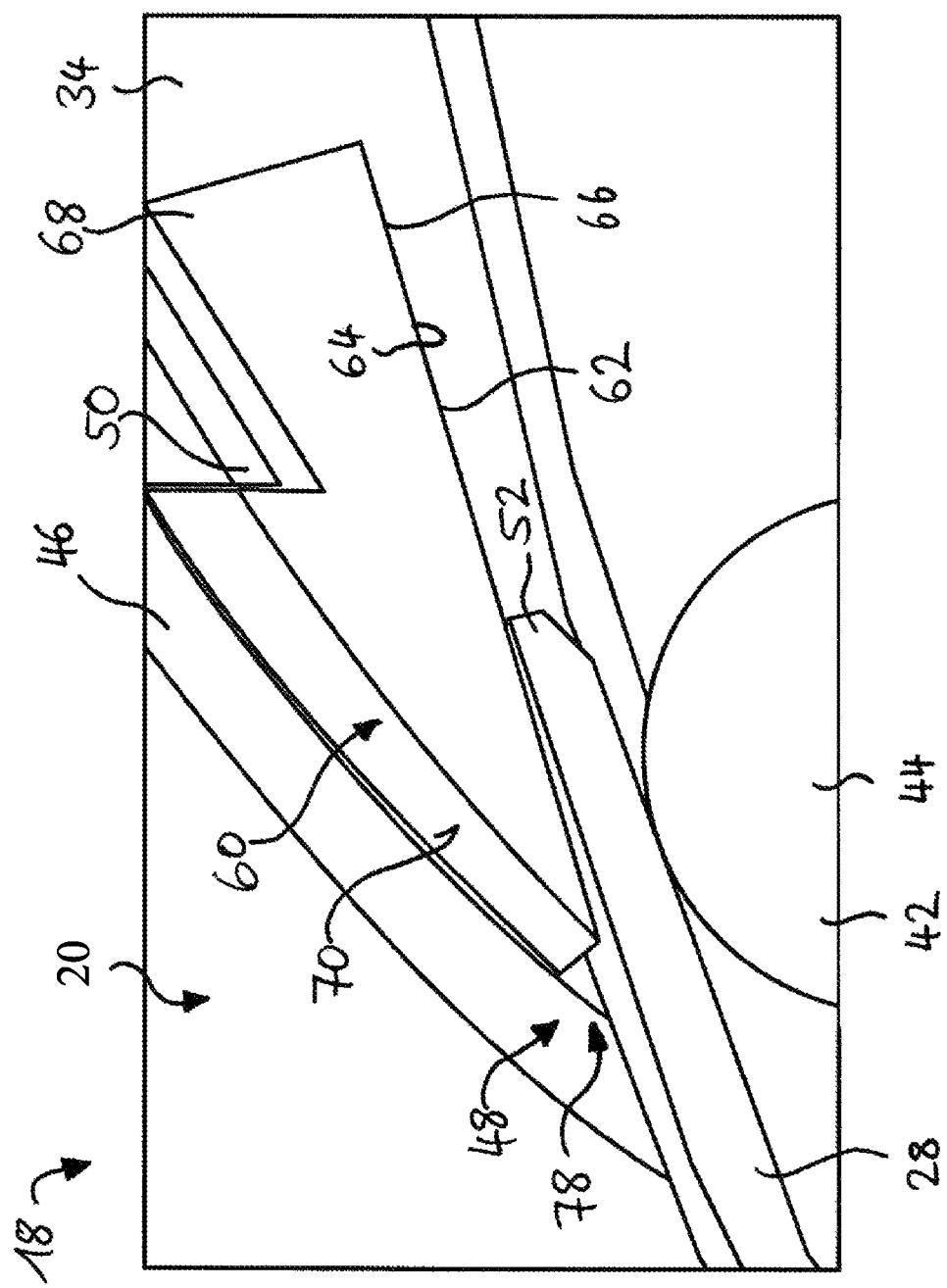
FIG. 5 depicts a detailed view of the installed catching bracket.
Figure 6:
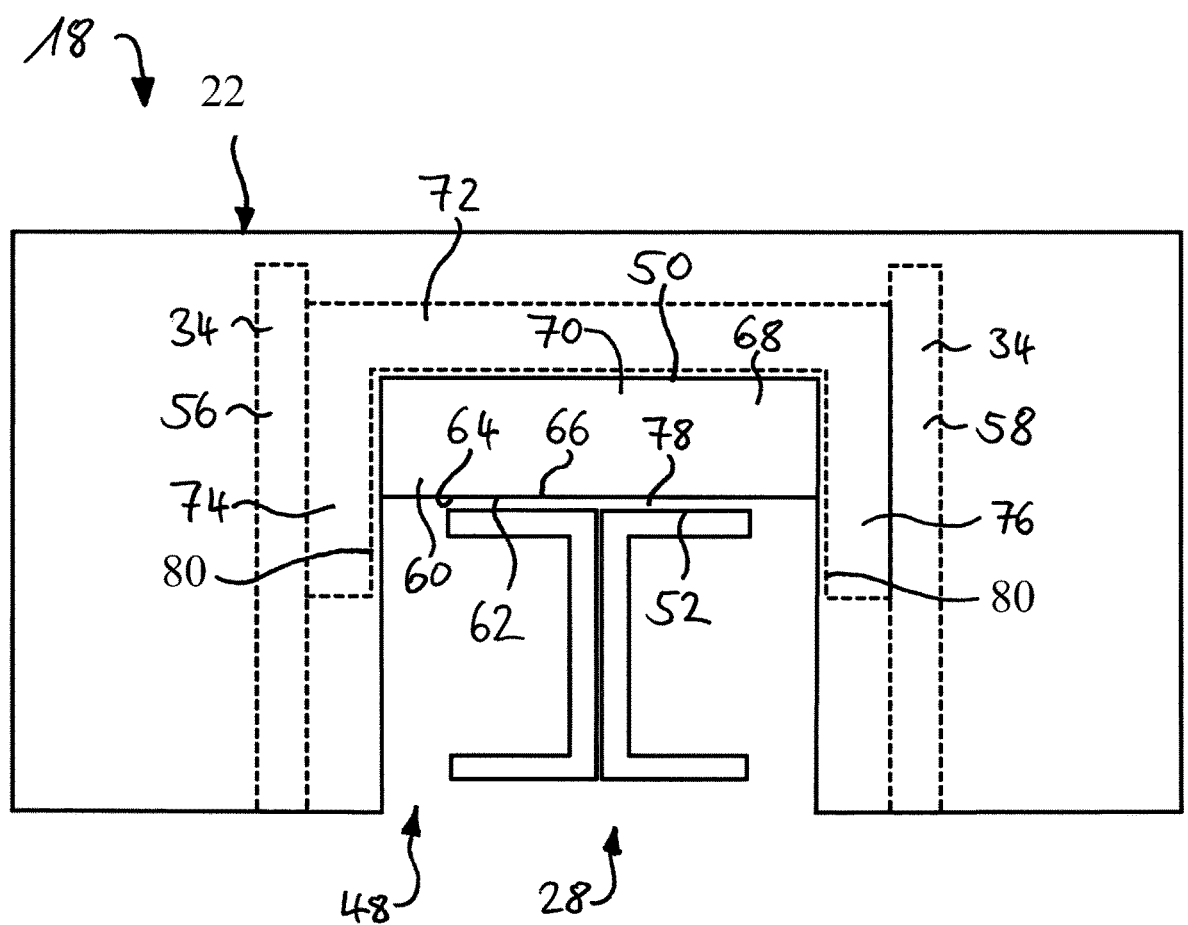
FIG. 6 depicts a frontal view of the edge member with installed catching bracket.

Referring now to FIGS. 4 to 6, a catching bracket 60 is installed. The catching bracket 60 is arranged within the track device opening 48, in particular within the gap portion 54.

The catching bracket 60 is aerodynamically formed and flush with the outer skin 46. The catching bracket 60 includes a track device engaging surface 62. The track device engaging surface 62 is preferably arranged on the lower side of the catching bracket 60. The track device engaging surface 62 may be configured as a sliding surface 64. The track device engaging surface 62 may comprise a PTFE liner 66.

The catching bracket 60 is preferably attached to the ribs 34, i.e., the inboard rib 56 and the outboard rib 58.

The catching bracket 60 may comprise a bracket body 68. The bracket body 68 may include the track device engaging surface 62 on its lower side. On its upper side, the bracket body 68 may include an aerodynamic surface 70. Preferably, the aerodynamic surface 70 is flush with the outer skin 46. The bracket body 68 may be formed as a massive body from aluminum or titanium, for example.

The catching bracket 60 may further include a mounting strap 72. The mounting strap 72, when viewed from the front (FIG. 6), is substantially U-shaped and comprises an inboard flange and an outboard flange 76. The mounting strap 72 is used to fix the catching bracket 60 to the fixed edge member 20, by attaching the inboard flange 74 to the inboard rib 56 and the outboard flange 76 to the outboard rib 58.

When installed, the catching bracket 60, in particular the bracket body 68, and the track device 28 form a residual gap 78. The residual gap 78 is substantially smaller than the gap portion 54. Thus, the area of the track device opening 48 is reduced.

The mounting strap 72, in particular the inboard flange 74 and the outboard flange 76, may form a sideload transfer surface 80. The sideload transfer surface 80 may also be configured as a sliding surface which can be covered in a PTFE liner.

Subsequently, the effects of the catching bracket 60 are described in more detail.

During normal operation, the catching bracket 60 reduces the size of the gap portion 54 down to the residual gap 78. As a result, the catching bracket 60 and an aft-skin 86 of the movable edge member 24 form a nozzle-like portion 88, when viewed in a cross section (FIG. 4).

Thus, an airflow 90 from the lower side of the airfoil arrangement 18 flows to the upper side of the airfoil arrangement 18. However, in contrast to a configuration without the catching bracket 60, the airflow 90 is less disturbed, thereby allowing for an increased angle of attack.

Furthermore, during operation, when a side load is applied to the movable edge member 24, for example, the side load may be transferred from the track device 28 via the side load transfer surface 80 to the ribs 34, thereby providing a load path.

In addition, if for some reason the support roller 42 has a failure, the track device 28 will move in such a way that the track device 28 engages the catching bracket 60, in particular, the bracket body 68, at the track device engaging surface 62. Hence, the residual gap 78 is closed.

However, since the track device engaging surface 62 is configured to support the track device 28 in a sliding manner, operation of the airfoil arrangement, i.e., movement of the movable edge member 24 may be retained, even in this failure condition.

Figure 7:
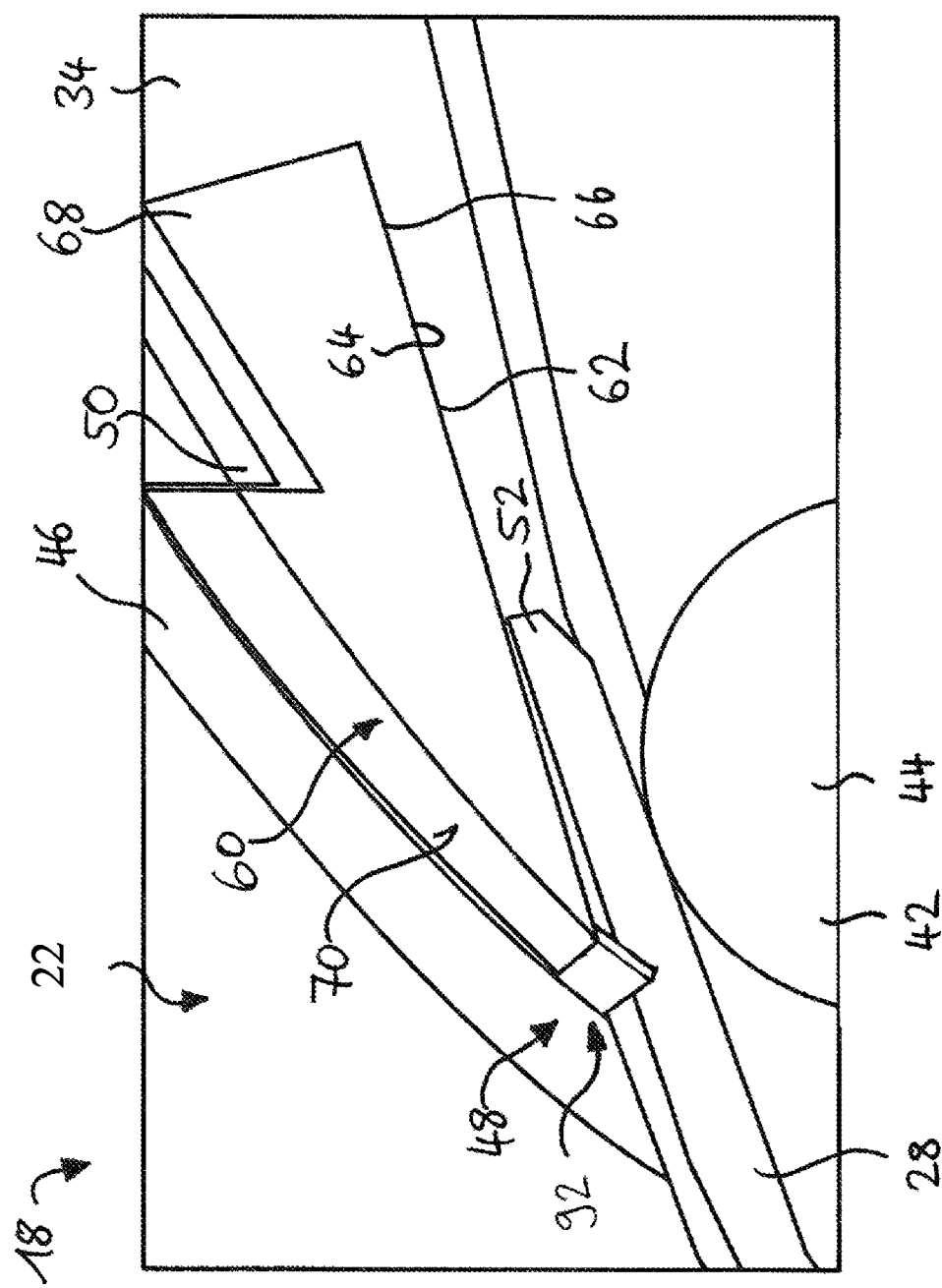
FIGS. 7 and 8 depict a variant of the catching bracket with a blade seal.
Figure 8:
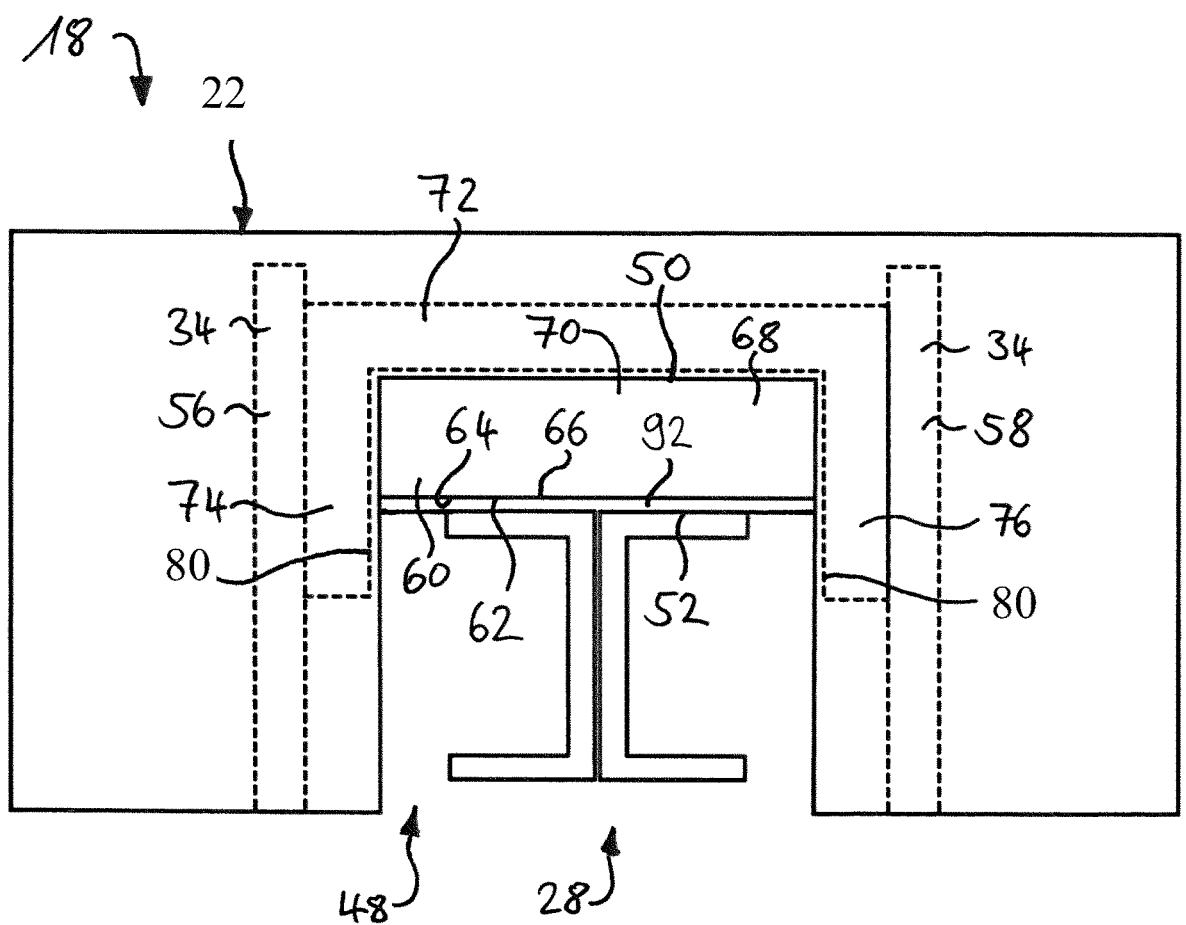

In a variant of the catching bracket 60, as is depicted in FIGS. 7 and 8, the catching bracket 60 further includes a blade seal 92, which almost completely seals the residual gap 78.

Figure 9:
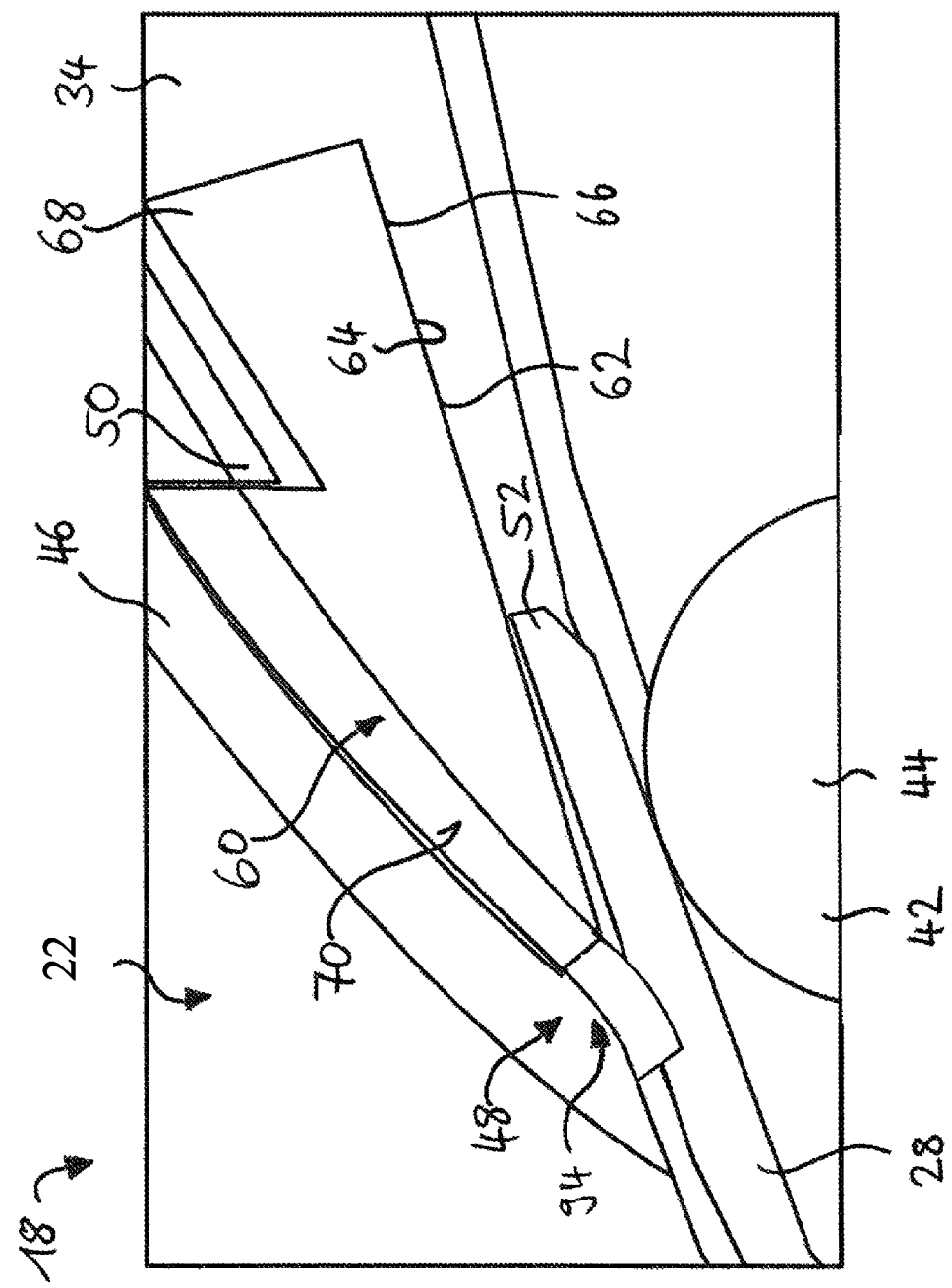
FIGS. 9 and 10 depict a variant of the catching bracket with an elastic sheet member.
Figure 10:
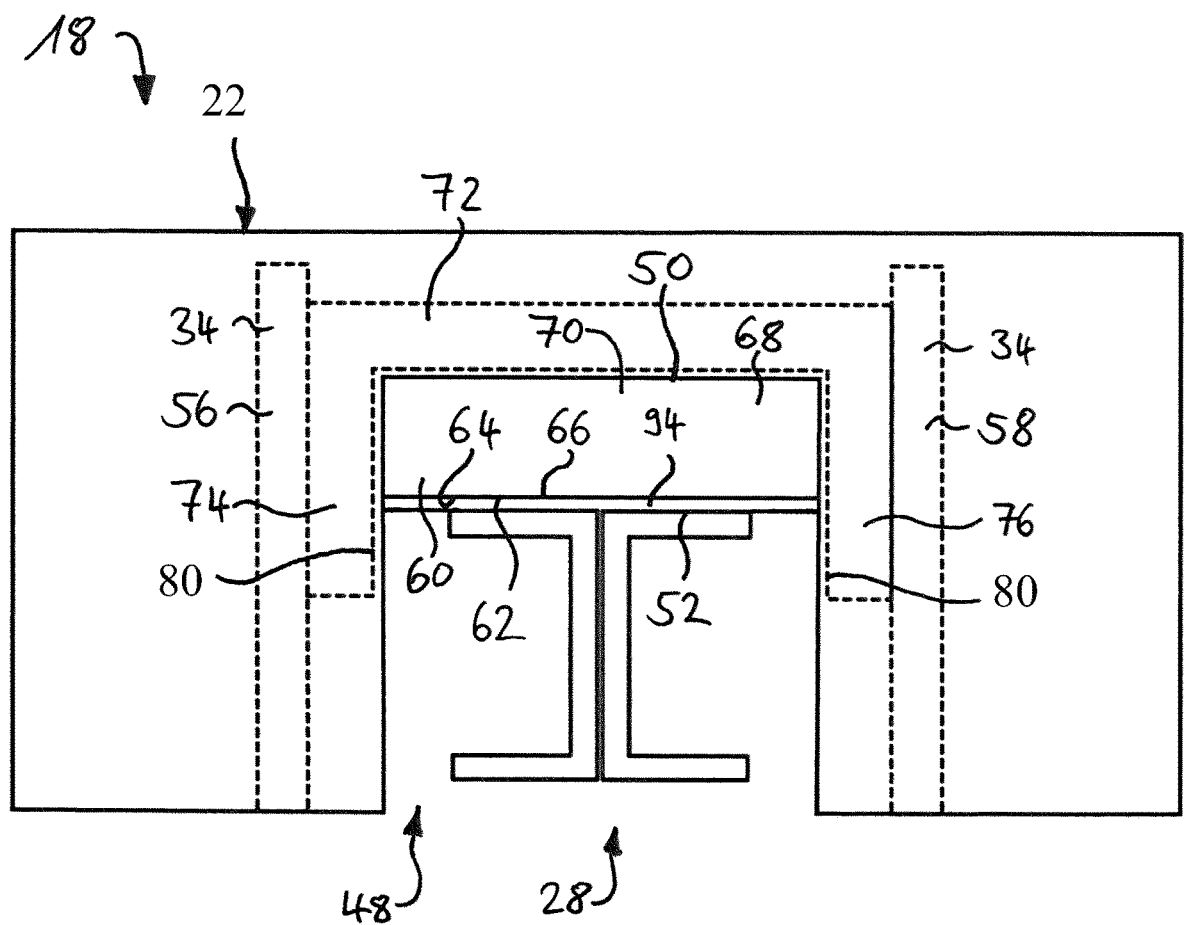

In another variant of the catching bracket 60, as depicted in FIGS. 9 and 10, the catching bracket 60 comprises an elastic sheet member 94, which is installed having a pretension such that the elastic sheet member 94 is permanently engaging the track device 28. Thereby, a permanent force fitted connection between the track device 28 and the fixed edge member 20 is generated.

It should be noted that the variants may be implemented simultaneously.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 wing
14 high-lift device
16 slat
18 airfoil arrangement
20 fixed edge member
22 fixed leading edge member
24 movable edge member
26 movable leading edge member
28 track device
30 link
32 movable roller
34 rib
36 guiding rail arrangement
38 upper guiding rail
40 lower guiding rail
42 support roller
44 forward roller
46 outer skin
48 track device opening
50 forward edge portion
52 upper surface
54 gap portion
56 inboard rib
58 outboard rib
60 catching bracket
62 track device engaging surface
64 sliding surface 66 PTFE liner
68 bracket body
70 aerodynamic surface
72 mounting strap
74 inboard flange
76 outboard flange
78 residual gap
80 side load transfer surface
82 sliding surface
84 PTFE line
86 aft skin
88 nozzle-like portion
90 air flow
92 blade seal
94 elastic sheet member

The invention claimed is:

1. An airfoil arrangement for an aircraft, comprising:
 a track device movable between an extended position and a retracted position, the track device being configured to support a movable edge member;
 a fixed edge member having an outer skin, the outer skin including a track device opening configured such that the track device moves through the track device opening when the track device is moved from the retracted position to the extended position;
 at least one support roller attached to the fixed edge member and configured for movably supporting the track device; and
 a catching bracket mounted within the track device opening so as to reduce an area of the track device opening and being configured such that, when there is a failure of at least one support roller, the catching bracket contacts the track device and transfers loads to the fixed edge member.

2. The airfoil arrangement according to claim 1, wherein the catching bracket comprises a bracket body that is configured for engaging the track device when there is a failure of the at least one support roller.

3. The airfoil arrangement according to claim 2, wherein the bracket body is configured for supporting the track device in a sliding manner.

4. The airfoil arrangement according to claim 1, wherein the catching bracket includes an aerodynamic portion which is configured to continuously extend the outer skin when the catching bracket is installed.

5. The airfoil arrangement according to claim 1, wherein the catching bracket includes an aerodynamic portion which is flush with the outer skin when the catching bracket is installed.

6. The airfoil arrangement according to claim 1, wherein the catching bracket comprises a blade seal configured for sealing a residual gap between the catching bracket and the track device.

7. The airfoil arrangement according to claim 1, wherein the catching bracket comprises an elastic sheet member configured to be installed with pre-tension such that the elastic sheet member is permanently engaging the track device to provide a permanent force-fitted connection between the track device and the fixed edge member.

8. The airfoil arrangement according to claim 1, the airfoil arrangement further comprising the movable edge member which is attached to the track device so as to be movable between the retracted position and the extended position.

9. The airfoil arrangement according to claim 8, wherein the movable edge member comprises an aft skin which faces the fixed edge member, wherein the aft skin and the catching bracket defines a flow gap which is configured to generate a nozzle-type flow from the lower side of the airfoil arrangement to the upper side thereof.

10. The airfoil arrangement according to claim 9, wherein the flow gap is tapered towards the upper side of the airfoil arrangement.

11. The airfoil arrangement according to claim 1, wherein the catching bracket comprises a mounting strap that is configured to be affixed to the fixed edge member.

12. The airfoil arrangement according to claim 11, wherein the mounting strap comprises at least one mounting flange configured for transferring side loads from the track device to the fixed edge member.

13. The airfoil arrangement according to claim 11, wherein the mounting strap comprises a liner portion configured to slidingly engage the track device, when a side load acts on the track device, to transfer the side load to the fixed edge member.

14. The airfoil arrangement according to claim 1, wherein the fixed edge member comprises at least one of an inboard rib or an outboard rib.

15. The airfoil arrangement according to claim 14, wherein the catching bracket is configured to be fixed to the at least one of the inboard rib or the outboard rib.

16. The airfoil arrangement according to claim 14, wherein the support roller is fixed to the at least one of the inboard rib or the outboard rib.

17. The airfoil arrangement according to claim 1, wherein the fixed edge member is a fixed leading edge member.

18. The airfoil arrangement according to claim 1, wherein the movable edge member is a movable leading edge member.

19. A wing for an aircraft comprising an airfoil arrangement according to claim 1.

20. An aircraft comprising an airfoil arrangement according to claim 1.

* * * * *